Aug. 8, 1961
W. G. HAYMES ET AL
2,995,091
REINFORCED PROPELLANT GRAINS AND ROCKET MOTORS CONTAINING SAME
Filed Jan. 10, 1958
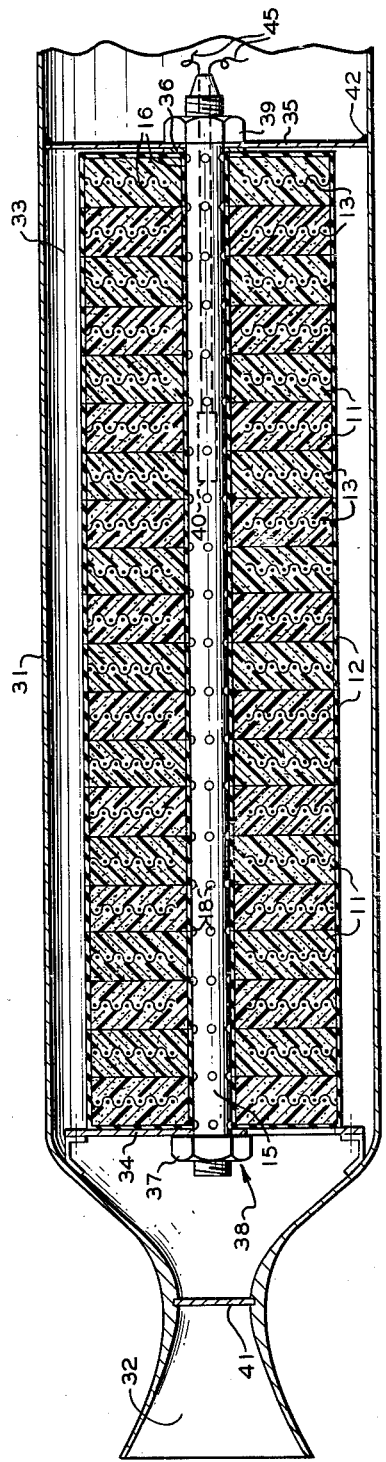
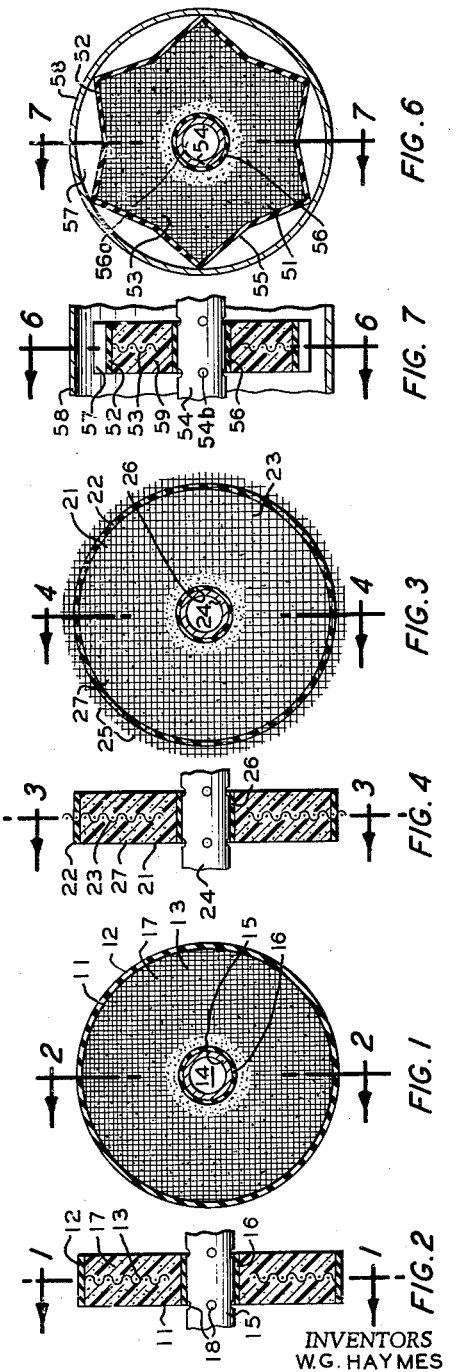
INVENTORS
W.G. HAYMES
A.C. KEATHLEY
BY
ATTORNEYS United States Patent Office 2,995,091
Patented Aug. 8, 1961

2,995,091
REINFORCED PROPELLANT GRAINS AND
ROCKET MOTORS CONTAINING SAME
William G. Haymes and Anthony C. Keathley, McGregor,
Tex., assignors to Phillips Petroleum Company, a corporation of Delaware
Filed Jan. 10, 1958, Ser. No. 708,330
6 Claims. (Cl. 102—98)

This invention relates to improved solid rocket propellants. In one aspect it relates to solid rocket propellants which are resistant to breakage.

Solid propellants which are utilized in rockets, such as JATO units, booster rockets, sustainer rockets, ejectors, and the like, comprise the fuel and an oxidant for burning the fuel. Oxidants commonly employed for the purpose include such materials as ammonium nitrate, ammonium perchlorate, and the like. The fuel is usually a hydrocarbon which, in addition, serves as a binder for bonding the particles of oxidant into a solid, usually called a grain. Binder-fuel materials include asphalt, rubbery or other tacky hydrocarbon-containing material such as copolymers of conjugated dienes and vinyl-pyridines or other substituted heterocyclic nitrogen base compounds. Solid propellant mixtures of this nature and a process for their production are disclosed and claimed in a copending application, Serial No. 284,447, filed April 25, 1952, by W. B. Reynolds, and J. E. Pritchard.

Solid rocket propellant charges are frequently classified into two general groups, (1) those having a restricted burning surface, and (2) those having an unrestricted burning surface. In addition, they are also classified according to the geometric form of their burning or unrestricted surfaces, that is, whether they are external, internal, or combination external-internal burning. A fabricator of solid rocket propellant charges is limited in his choice of geometric form or shape of the molded charge because the burning rate of a propellant material is largely determined by its chemical composition. By varying the geometric form of the burning surfaces of a propellant grain the fabricator is able to achieve some latitude in fabricating propellant grains with certain burning times, structural strength, available thrust, and the like.

The surface of a grain which is restricted does not burn. By the term restricted, restricted surface, etc., is meant a grain surface tightly covered with a restricting material which is a slow burning material used for the purpose in the art, such as cellulose acetate, ethyl cellulose, butadienemethyl vinylpyridine copolymer, GR–S, rubbery compositions free from oxidizing agents, and the like.

By the terms unrestricted, unrestricted surface, and the like is meant merely what the word implies, that is, a surface which is not restricted. If the surface of an end, side, or tubular openings of a grain is not covered with a restricting material, the surface is not restricted or is said to be a burning surface. The outer surface of a grain of propellant which is molded to fit the inner surface of a case is considered unrestricted and is a burning surface even though it tightly fits the case. In other words a restricted surface is one which is sealed by a restricting material and truly does not exhibit exposed surface.

The burning time of a given propellant grain is regulated to a marked degree by the geometric shape of the grain. For fast burning rockets the shaped charge is designed to provide a proportionately greater burning (unrestricted) surface than for the charge of a slow burning rocket. For example, if a solid cylindrical grain, burning from one end only possesses a burning time of 20 seconds, the same cylindrical grain will have a burning time of only 10 seconds when burned at both ends. A pair of solid cylindrical grains, each being half the length of a 20 second grain when burned at both ends of each will have one fourth the burning time or a five second burning time. JATO rockets many times are provided with grains having about 20 to 30 seconds burning time. Airplane seat ejection equipment is provided with rockets having about one half second burning time. Propellant grains molded in the form of discs or washers are easily produced which have such short burning time. For example, a composition which has a burning rate of one inch per second, when molded into a disc or washer one inch thick and burned from both plane surfaces is consumed in one half second. As many of the one inch discs, as desired, are loaded into a case, face to face, and yet the rocket burning time is one half second.

Propellant grains of such shape are frequently subject to breakage. A surface of a grain formed by breakage is just as much a burning surface as the surface produced in the fabrication or molding of the grain. However, breakage surface usually causes irregular and unreproducible burning times, thus breakage is to be avoided.

One object of this invention is to provide rapid burning propellant grains which are resistant to breakage.

Another object of this invention is to provide rapid burning propellant grains which are simple to fabricate and at a minimum increase in cost over prior art propellant grains of the same size and shape.

Yet another object of this invention is to provide rapid burning propellant grains which are resistant to breakage and can be mass produced.

Still other objects and advantages will be realized upon reading the following description and the attached drawing which respectively describes and illustrates preferred embodiments of this invention.

Broadly speaking this invention involves embedding a screen, such as a wire screen or a hardware cloth in a disc or washer shaped grain as a reinforcement.

In the drawing,

FIGURE 1 is a sectional view of a grain of our invention taken on the line 1—1 of FIGURE 2.

FIGURE 2 is a cross sectional view taken on the line 2—2 of FIGURE 1.

FIGURE 3 is the sectional view of another embodiment of our invention taken on the line 3—3 of FIGURE 4.

FIGURE 4 is a cross sectional view taken on the line 4—4 of FIGURE 3.

FIGURE 5 is a longitudinal view, partly in section, of an assembled rocket of our invention.

FIGURE 6 is a sectional view of still another embodiment of invention taken on the line 6—6 of FIGURE 7.

FIGURE 7 is a cross sectional view taken on the line 7—7 of FIGURE 6.

Specifically our invention comprises a fast burning rocket grain comprising a grain of solid propellant material having a diameter greater than the length of its axis, said grain having a side surface and two end surfaces, said grain having both end surfaces exposed as burning surfaces, said end surfaces being mutually parallel and normal to said axis and a screen embedded in said grain mid-way of said end surfaces.

Furthermore our invention comprises a rocket motor having a combustion chamber surrounded by a case, a nozzle at one end of said case, said nozzle providing a passage for exit of combustion gases from said combustion chamber, a plurality of solid propellant grains having diameters greater than the length of their axis, each grain having a side surface and two end surfaces, said grains being disposed end to end in said combustion chamber and being supported by the linner wall of said casing, both end surfaces of said grains being unrestricted as burning surfaces, said end surfaces of each grain being mutually parallel and normal to its axis, a passage in said combustion chamber for passage of combustion gases toward said nozzle, a screen embedded in each grain mid-way of its end surfaces and an igniter in operative communication with said solid propellant grains.

Referring now to the drawing and specifically to FIGURES 1 and 2, reference numeral 11 identifies a disc or washer-shaped solid propellant grain. A layer of restricting material 12 surrounds this disc shaped grain. Reference numeral 13 identifies a flat or plane screen or hardware cloth embedded in the central portion of the disc or washer 11. A perforation or opening 14 along the axis of the grain 11 is provided with a restricting material 16. An igniter 15 is disposed within restricting material 16 in perforation 14. A plurality of openings 18 are provided in the wall of the tube of the igniter to provide an exit for burning igniter material for starting burning of the solid propellant.

On reference to FIGURE 5 it will be noted that a plurality of the flat grain discs or washers are positioned in case 31 side by side and touching each other. The openings 18 in the igniter tube are so positioned that flaming igniter material is ejected through these openings and along the plane end surfaces of adjacent flat grains even though the grains are in contact with each other.

Restricting materials 12 and 16 are, if desired, selected from the hereinbefore recited restricting material.

FIGURES 3 and 4 illustrate a flat grain of solid propellant in general similar to that described relative to FIGURES 1 and 2. The difference between propellant grains of FIGURES 1 and 2, and 3 and 4 is that screen 23, in FIGURES 3 and 4 extends beyond the outer periphery of the grain. The disc grain or washer of FIGURES 3 and 4 is identified by reference numeral 21 and is covered by restricting material 22 while perforation 24 is lined with restricting material 26. The outer ends of the screen wires in this embodiment are identified by reference numeral 25. It is noted that the outer ends of these wires extend not only beyond the outer surface of the actual propellant grain but also extend through and beyond the outer surface of the restricting material 22. When an assembly of rocket grains, similar to grain 21, is disposed in a case the ends 25 of the screen wires extend into a space similar to space 33 (FIG. 5). Such a space as space 33 is provided for passage of hot products of combustion from, for example, the right hand end of the rocket toward the nozzle and with these wire ends protruding heat is conducted into the body of the discs to assist in heating them to combustion temperature. By so conducting heat into the body of these flat grains combustion is more rapid and thrust of the rocket motor accordingly greater though for a shorter period of time.

Reference numeral 27 identifies the actual propellant illustrated in FIGURES 3 and 4.

In FIGURES 6 and 7 are illustrated another embodiment of our invention in which the outer surfaces of the propellant grains or discs 51 are star shaped so as to provide passages 57 for flow of combustion gases toward the nozzle of the case. When using this embodiment of grain, it is not necessary to provide an annular passage as passage 33 illustrated in FIGURE 5. Furthermore, when using the embodiment of FIGURES 6 and 7, the propellant grains are self-supporting since the points of the star-shaped grains are disposed against the inner wall of the case. Since in the embodiment of FIGURES 6 and 7 the propellant grains are intended to burn from their plane end surfaces, the periphery of the grains are restricted with a coating of restricting material 52. This grain also contains a screen or hardware cloth 53 disposed in a manner similar to that illustrated in FIGURES 1 and 2. Reference numeral 56a identifies a centrally positioned cylindrical perforation into which an igniter tube or assembly 54 is disposed. This igniter tube is provided with perforations or openings 54b for exit of flame and combustion products from the igniter material to the unrestricted surfaces of the grains 51.

Reference numeral 55 identifies the star-shaped exterior surface of grain 51 which is covered with restricting material 52. Within perforation 56a, disposed around the wall thereof and surrounding igniter tube 54 is restricting material 56 similar to restricting material 26 and 16 of FIGURES 4 and 2 respectively. Reference 58 identifies a metallic case in which propellant grains 51 are disposed. Reference numeral 59 identifies the actual propellant material of FIGURES 6 and 7.

In FIGURE 5 is illustrated an assembly of propellant grains of our invention disposed operatively within the rocket case 31. A conventional blow out type starter disc 41 is disposed at the inner entrance of the nozzle 32. The use of such a starter disc is conventional in the art. A plurality of flat grains 11 are disposed within case 31 as illustrated. Each of these grains is perforated to accommodate an ignition assembly 38. However, the wall of each perforation along the axis of disc 11 is coated with a restricting material similar to those illustrated in the other figures of the drawing. Detail of the igniter tube 15 of the igniter assembly 38 is clearly shown in FIGURE 2. In this figure it is seen that a tube is provided with openings 18 for exit of the flame and combustion products of the igniter material which is disposed within tube 15. The ends of tube 15 are threaded for accommodation of nuts 37 and 39 for holding the assembly of propellant discs tightly together. Between nut 37 and the first propellant disc 11 is disposed a spider 34 which serves to support the left hand end of the assembly of propellant discs in casing 31. The left hand plane surface of the propellant disc 11 adjacent spider 34 is only partly covered with arms of the spider but even the portion of the surface covered with arms of the spider still is burning surface because the spider is not in sufficiently close contact with the disc 11. The disc 11 at the opposite end of the assembly is in contact with a washer 36 and next to the washer is a baffle plate 35 which serves as a support for the right hand end of the assembly of propellant grains. With plate 35 welded at welds 42 to the inside of casing 31, spider 34 does not need to be welded to the casing. However, if desired, and to make a more substantial assembly it is desirable under some conditions to weld the ends of spider 34 to the wall of the case. An annular space 33 is provided for passage of gases toward nozzle 32.

An electric squib 40 is provided within the igniter 15, as illustrated, for igniting or firing the starter material. Electric squibs are available on the market and accordingly their construction need not be explained here in detail. Broadly a squib comprises a pair of electric wires 45 for conducting electric current to set off the squib. Some squibs are provided with a resistance wire so that upon passage of electric current through wires 45 a resistance wire in the squib is heated which ignites the squib to set off the starter material and to fire subsequently the rocket grains.

A suitable pelleted igniter composition and method for manufacturing is disclosed in copending application Serial No. 592,995, filed June 21, 1956, by Liles G. Herring. Igniter ingredients as disclosed in this latter mentioned copending application include pyrotechnic components such as potassium chlorate, barium nitrate, zirconium dichromate, zirconium-nickel alloy, aluminum, magnesium, titanium, zirconium hydride, boron, and such supplementary pressure components as black powder and tetranitrocarbazole. A suitable binding agent was disclosed as being ethyl cellulose.

In making a propellant grain such as that illustrated in FIGURES 1 and 2 and 6 and 7, a portion of the propellant composition is extruded and placed in a mold, screen 13 or screen 53, as the case may be, is then placed in the mold on top of the extruded material and the remainder of the propellant material is extruded and placed on top of the screen. The mold is then closed which pressures the propellant material into pressure contact with the screen. The contents of the mold are then cured and after curing the molded grain is removed. As many of the molded grains as required for assembly in a rocket motor are prepared and are then coated with such a restricting material as hereinbefore mentioned to make certain that the outer surface or the peripheral surfaces of the individual grains will not burn.

When such restricting material as some of those mentioned hereinbefore for example, cellulose acetate, ethyl cellulose, are employed these materials are preferably secured to the sides of the propellant grain by plastic or rubber cement, the rubber cement, and the like may be bonded to the grain by curing. The bond between the composite grain and the restricting material must be strong and tight in order that no burning of the grain occurs along the restricted surfaces. Suitable restrictor or restricting materials recipes for use with the propellant grains of this invention are fully described and claimed in a copending application Serial No. 538,078, filed October 3, 1955, by Joseph H. Murphy, Jr. In this copending application a GR–S based restrictor recipe is described along with several butadiene-methylvinylpyridine base restrictor recipes.

In preparing a propellant grain as illustrated in FIGURES 3 and 4, a portion of the propellant composition is extruded and placed in the bottom half of a mold. A thin circular mold member which supports the screen 23 is placed upon the bottom half of the mold and then the top half of the mold is placed over this screen containing member and the second half of the propellant composition is extruded and placed in this portion of the mold. Upon closing the mold the several portions thereof are pressed tightly together and the propellant composition is squeezed tightly into contact with the screen. The thin mold member which supports the screen is made especially to accommodate a screen of a definite diameter and around the outer portion of this portion of the mold are imprints into which the free ends 25 of the screen tightly fit so that upon closing of the mold and curing the propellant composition will not extrude between the ends of the wire and the mold. After curing is completed the cured grain is removed from the mold and if desired suitable restricting material is added to the peripheral surface.

This embodiment of our propellant grain serves a double purpose. First, the grain is mechanically strong because of the embedded metallic screen, and second the ends of the screen wire are exposed and extend into such an annular space as space 33 illustrated in FIGURE 5 and serve as heat conducting elements for passage of heat from the annular space into the body of the grain. In this way heat is conducted into the grain in a preheating operation which expedites combustion and operation of the rocket.

We find that propellant grains for rapid firing rockets made with embedded screen or hardware cloth, as herein disclosed, are mechanically strong and will withstand relatively severe handling.

Such rapid burning propellant grains are used in rocket motors in conjunction with aircraft seat ejectors, short ranged missiles and the like. Such rocket motors are required to be completely burned out within from, for example, one tenth second to as long as two seconds. It is realized that rocket motors of any desired burning time can be made merely by design of the form of the rocket propellant taking into account the propellant composition and burning rate. Furthermore, the screen wire or hardware cloth embedded into the disc-shaped propellant grains as herein disclosed not only impart resistance against breakage upon handling but assist markedly in preventing breakup of propellant grains when the charge is fired. We have illustrated in our drawings and described in the specification that the wire screens are positioned midway of the two end surfaces of a given disc-shaped propellant grain with the object in mind that the screen remains at the center of the propellant throughout its entire period of burning. For example, when one half of the propellant is burned the screen is still in the middle and inparts the property of strength and resistance against break-up.

While certain embodiments of the invention have been described for illustrative purposes, the invention obviously is not limited thereto.

We claim:
1. A fast burning rocket grain comprising, in combination, a grain of solid propellant material having a diameter greater than the length of its axis, said grain having a side surface and two end surfaces, said grain having both end surfaces exposed as burning surfaces, said end surfaces being mutually parallel and normal to said axis, and a screen embedded in said grain and midway of said burning surfaces.

2. A fast burning rocket grain comprising, in combination, a grain of solid propellant material having a diameter greater than the length of its axis, said grain having a side surface and two end surfaces, said grain having its side surface restricted and having both end surfaces exposed as burning surfaces, said grain having a centrally positioned axial perforation, the wall of said perforation being restricted, said end surfaces being mutually parallel and normal to said axis, and a screen embedded in said grain and midway of said burning surfaces.

3. A fast burning rocket grain comprising, in combination, a grain of solid propellant material having a diameter greater than the length of its axis, said grain having a side surface and two end surfaces, said grain having its side surface restricted and having both end surfaces exposed as burning surfaces, said grain having a centrally positioned axial perforation, the wall of said perforation being restricted, said end surfaces being mutually parallel and normal to said axis, and a screen embedded wholly within said grain and midway of said burning surfaces.

4. A fast burning rocket grain comprising, in combination, a block of solid propellant material having a side surface and a pair of mutually parallel end surfaces, the diameter of said grain being greater than the length of its axis, and said end surfaces being normal to said axis, a restricting material in operative contact with said side surface, said end surfaces being exposed burning surfaces, said grain having an axial perforation, a restricting material in operative contact with the wall of said perforation, a flat screen embedded in said grain, the plane of said screen being normal to said axis and the screen being disposed midway of said burning surfaces, the outer periphery of said screen extending beyond said side surface of said grain and through the restricting material in contact with said side surface.

5. A fast burning rocket grain comprising, in combination, a right cylindrical block of solid propellant material having a diameter greater than the length of its axis, a restricting material in operative contact with the cylindrical surface of said block, the end surfaces being exposed burning surfaces, said block having an axial perforation, a restricting material in operative contact with the wall of said perforation, and a screen embedded in said block midway of said burning surfaces, the plane of said screen being normal to said axis.

6. A fast burning rocket grain comprising, in combination, a right cylindrical block of solid propellant material having a diameter greater than the length of its axis, a restricting material in operative contact with the cylindrical surface of said block, the end surfaces being exposed burning surfaces, said block having an axial perforation, a restricting material in operative contact with the wall of said perforation, and a flat screen embedded in said block midway of said burning surfaces, the plane of said screen being normal to said axis and the outer edge of said screen extending beyond said restricting material in operative contact with the cylindrical surface of said block.

References Cited in the file of this patent

UNITED STATES PATENTS

| | | |
|---|---|---|
| 1,530,692 | Paulus | Mar. 24, 1925 |
| 2,434,652 | Hickman | Jan. 20, 1948 |

FOREIGN PATENTS

| | | |
|---|---|---|
| 652,542 | Great Britain | Apr. 25, 1951 |